United States Patent [19]
Johann

[11] Patent Number: 5,396,479
[45] Date of Patent: Mar. 7, 1995

[54] APPARATUS AND METHOD FOR SETTING A THRESHOLD LEVEL TO MAINTAIN DUTY CYCLE IN A PULSE WIDTH MODULATED OPTICAL RECORDING SYSTEM

[75] Inventor: Donald F. Johann, Palo Alto, Calif.

[73] Assignee: Maxoptix Corporation, San Jose, Calif.

[21] Appl. No.: 239,249

[22] Filed: May 6, 1994

[51] Int. Cl.6 .......................... G11B 7/00; G11B 5/09
[52] U.S. Cl. ........................................ 369/59; 364/54; 364/124; 327/78; 327/175; 327/31
[58] Field of Search ................. 369/59, 48, 54, 124, 369/116; 307/234, 355, 265; 328/111; 360/48; 355/51; 340/146.2

[56] References Cited

U.S. PATENT DOCUMENTS

| | | | |
|---|---|---|---|
| 4,821,253 | 4/1989 | Usui et al. ...................... 360/48 X |
| 4,954,863 | 9/1990 | Harada et al. ...................... 355/51 |
| 5,050,156 | 9/1991 | Barton ............................... 369/116 |
| 5,184,343 | 2/1993 | Johann et al. ..................... 369/116 |
| 5,204,848 | 4/1993 | Cardero et al. ..................... 369/48 |
| 5,218,591 | 6/1993 | Shimamoto et al. ................ 369/54 |
| 5,293,369 | 3/1994 | Melas .................................. 369/59 |
| 5,315,284 | 5/1994 | Bentley et al. .................. 340/196.2 |

Primary Examiner—Aristotelis Psitos
Assistant Examiner—Patrick Wamsley
Attorney, Agent, or Firm—Blakely, Sokoloff, Taylor & Zafman

[57] ABSTRACT

An apparatus for setting a threshold voltage for determining bit positions of digital data stored on an optical recording device utilizing pulse width modulation. The optical recording device reads a pattern from an optical medium. The read pattern has a fixed, known duty cycle. A feedback circuit processes the pattern according to an initial threshold voltage. The feedback signal is then input to a comparator. The comparator compares the feedback signal against the pattern. Based on this comparison, the amount of current input to and output from a compensation circuit is adjusted. Thereupon, the compensation circuit sets the threshold voltage accordingly.

12 Claims, 5 Drawing Sheets

APPARATUS AND METHOD FOR SETTING A THRESHOLD LEVEL TO MAINTAIN DUTY CYCLE IN A PULSE WIDTH MODULATED OPTICAL RECORDING SYSTEM

FIELD OF THE INVENTION

The present invention pertains to the field of optical recording systems. In particular, the present invention relates to an apparatus and method for determining a threshold level in a pulse width modulated optical recording device.

BACKGROUND OF THE INVENTION

Presently, optical recording systems enjoy great commercial appeal because of their high storage capacity, cost effectiveness, and reduced susceptibility to noise and data corruption. Optical recording systems are ideal for storing vast mounts of data on a permanent or long term basis.

Typically, optical recording systems use a laser or some other form of light source to "read" and "write" data from/to an optical medium. In a "write" operation, the light is directed by means of a lens assembly and focused onto the optical medium. The focused light causes the magnetic characteristic of a portion, commonly referred to as a "domain", of the optical medium to become altered. The optical medium retains the altered characteristic, even after the light source has been removed. By pulsing the laser to write domains, digital data can be "written" and stored onto the optical medium. Later, the data are retrieved by directing the light to the optical medium and reading the information indicated by the domains. The data are "read" from the medium by detecting the signal contained in the light reflected off the medium.

In the past, pulse position modulation (PPM) was used to record the digital data onto the optical medium. In PPM systems, the value of each instantaneous sample of a modulating signal is caused to modulate the position in time of a pulse. However, pulse width modulation (PWM) has recently been applied to optical recording systems because of its capability to increase storage capacity. In a PWM scheme, the value of each instantaneous sample of the modulating signal is caused to modulate the duration of a pulse. Hence, in PPM recording, each isolated magnetic domain signifies a single "1". Whereas, in PWM recording, a "1" is signified by a change from one magnetic state to another. Essentially, two "1's" are signified by the edges of a magnetic domain. Consequently, PWM effectively doubles the amount of information that can be recorded within a given storage area. Increasing the areal density is advantageous because it reduces cost and increases the mount of data that can be stored within a given area.

However, one problem with utilizing a PWM scheme is that a threshold must be established very precisely. Referring to FIG. 1, the positions of the "1" bits in PPM recording are determined by detecting the peaks of the resulting analog readback waveform. The peaks can be precisely determined by differentiating the analog waveform and detecting where the differentiated waveform crosses zero volts (e.g., zero crossings). In contrast, for PWM recording, a "1" bit is determined by the location where the analog signal crosses a pre-defined threshold level. The timing of these "1" bits is extremely dependent on the positioning of the threshold level. Even millivolt errors in the threshold level can produce nano-second variations of the data bits. Given that the widths of the domains are in micrometers, small errors in the threshold level can easily result in read errors.

Thus, there is a need in the prior art for an apparatus and method for determining and setting a threshold level in an optical recording system having a pulse width modulation scheme.

SUMMARY OF THE INVENTION

The present invention relates to an apparatus and method for setting a threshold voltage for determining bit positions of digital data stored on an optical recording device utilizing pulse width modulation. The VFO field recorded on the optical disk is used in determining the level that the threshold should be set at. The VFO field has a fixed, known duty cycle of 50%. A feedback circuit feeds back an error signal which is based according to an initial threshold voltage. The output of the circuit controlled by this feedback signal is then compared against the 50% duty cycle. Based on this comparison, the amount of current input to and output from a compensation circuit is adjusted. In the currently preferred embodiment, a charge pump for charging and discharging a capacitor is used. If it is determined that the error signal produces a duty cycle greater than 50%, more current is input to the compensation circuit to increase the threshold. Conversely, if the error signal causes the duty cycle to be less than 50%, more current is caused to be output from the compensation circuit, thereby decreasing the threshold. In the currently preferred embodiment, a differential signal scheme is implemented throughout the adjustment process in order to maximize the signal to noise ratio for improved margin.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for determining and setting a threshold level in an optical recording system having a pulse width modulation scheme is described. In the following description, for purposes of explanation, numerous specific details are set forth, such as charge pumps, transistors, compensation networks, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention.

In the currently preferred embodiment of the present invention, the information contained in a variable frequency oscillator (VFO) field is used in determining the level to which the threshold should be set. The VFO field is the field that immediately precedes the data field recorded on the optical medium. It is conventionally used to lock the oscillators of a phase-locked-loop circuit to the phase of the incoming data bits. By definition, the VFO field is comprised of a signal having the highest frequency allowed by the encoding format. The VFO field is comprised of a string of marks and spaces. A mark is a magnetic domain of a single orientation that was placed on the disk during the write process. A space is the area between the marks and has a magnetic orientation opposite that of the marks. A mark will cause the analog signal from the transducer to increase in amplitude while a space will cause it to decrease in amplitude. The timing width of each mark is equal to the timing width of each space of the VFO field. In other words, the VFO has a 50% duty cycle. Hence, the currently preferred embodiment of the present invention adjusts the threshold level based on the marks and spacings of the VFO field. Once adjusted, the threshold remains correct as applied to the trailing data field.

Figure 1:
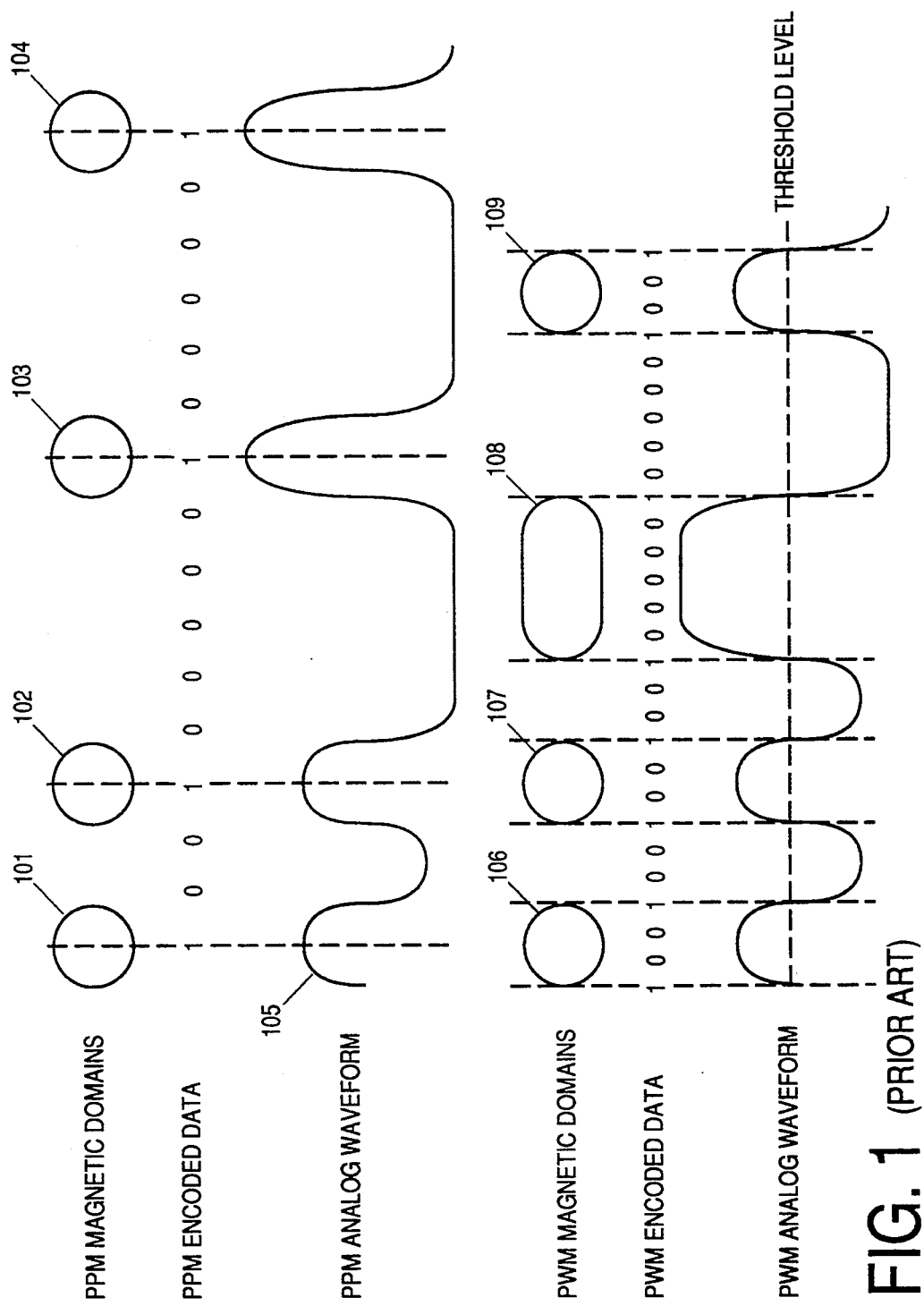
FIG. 1 refers to the positions of the "1" bits in PPM recording which are determined by detecting the peaks of the resulting analog readback waveform and contrasts this to the "1" bits in PWM recording.
Figure 2:
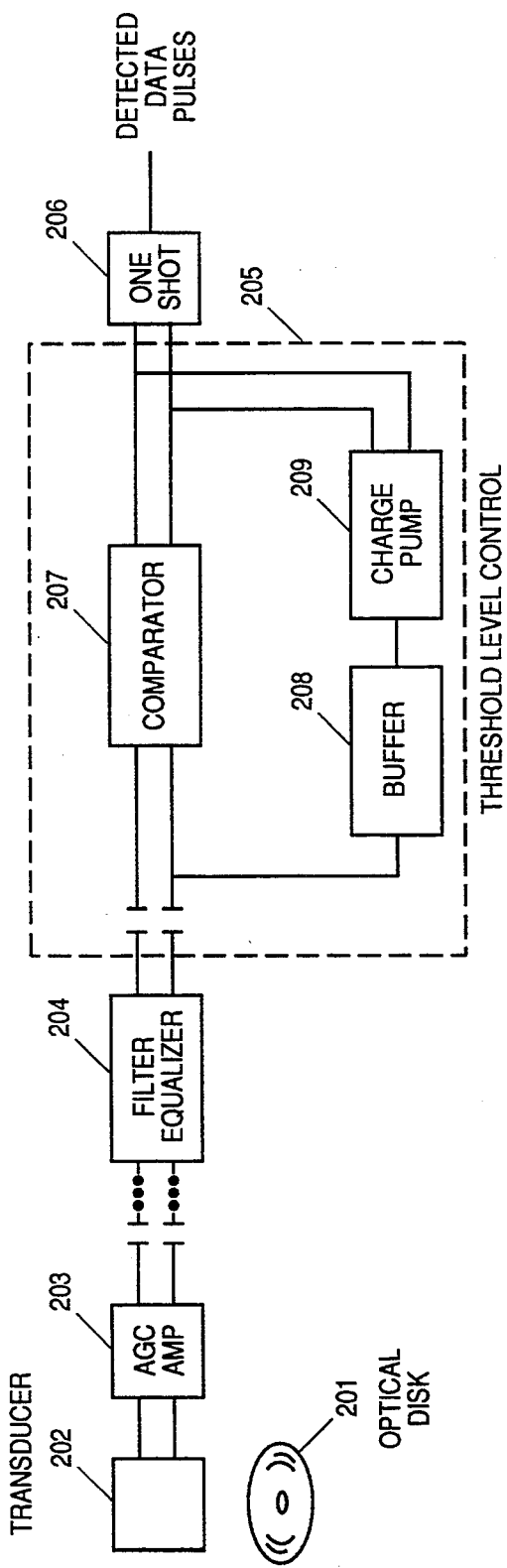
FIG. 2 shows a block diagram of a read channel of an optical disk drive incorporating the currently preferred threshold adjustment circuit.

FIG. 2 shows a block diagram of a read channel of an optical disk drive incorporating the currently preferred threshold adjustment circuit. The VFO field recorded onto the optical disk 201 is read by transducer 202 and converted into an electrical signal. Transducer 202 is comprised of an optics system and an optical detector. This electrical signal is then processed by the filter and equalizer block 204. Based on the read VFO field, the threshold level control block 205 adjusts the threshold level accordingly. Next, a one-shot 206 is used to generate a data pulse for each edge on the signal output of the comparator 207, these pulses corresponding to the data field stored on the optical disk 201. These data pulses are further processed and eventually sent to the host computer system.

The threshold level control block 205 is comprised of a comparator 207, a charge pump 209 coupled to the output of comparator 207, and a buffer 208 feeding back to the comparator 207. Basically, comparator 207 level slices the electrical signal generated by the read VFO field. The sliced signal from comparator 207 is used m charge or discharge a capacitor through charge pump 209. This signal is then buffered and fed back in a negative feedback configuration to control the AC coupling pull-up voltage of one half of a differential signal.

Figure 3:
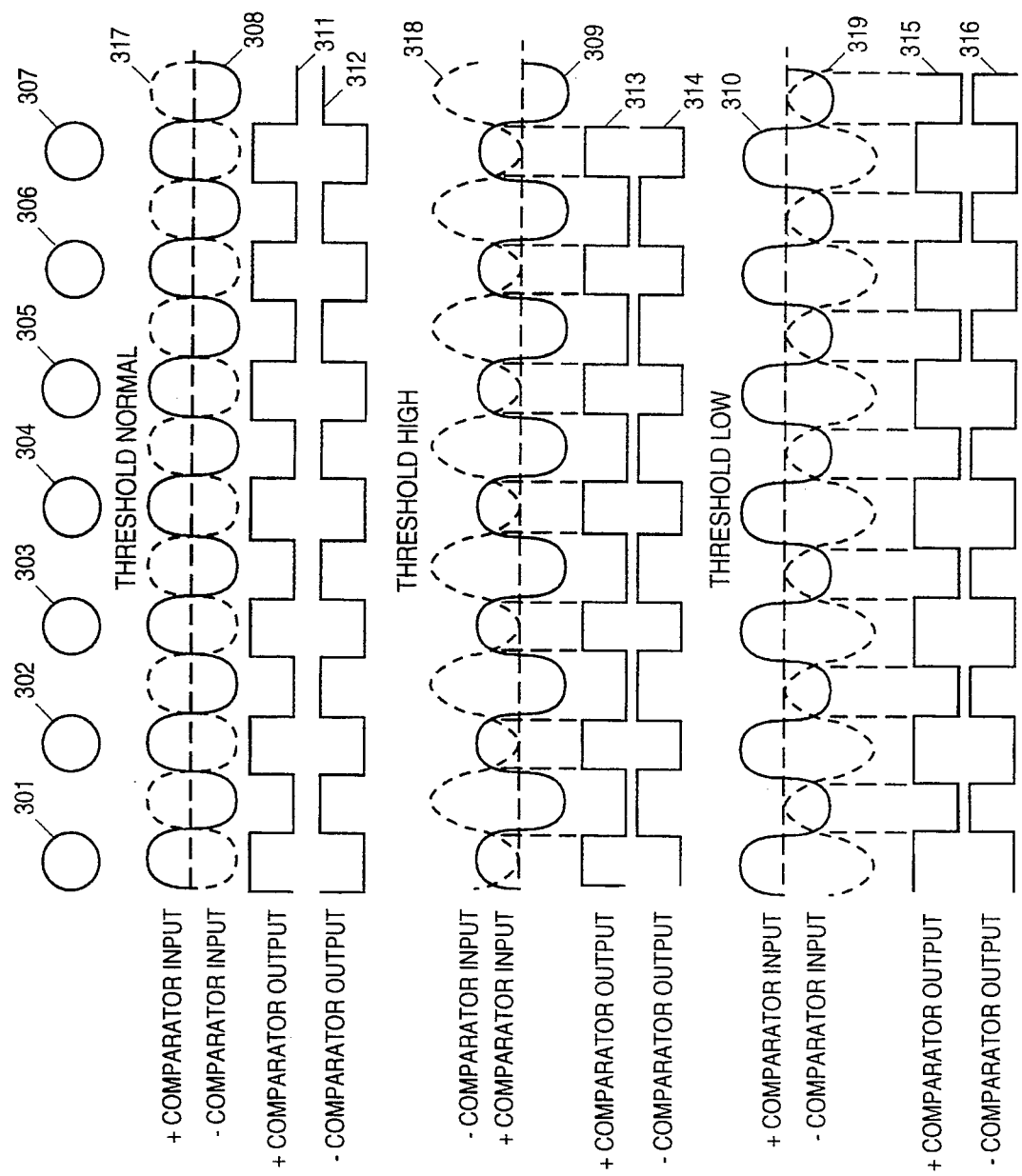
FIG. 3 shows a timing diagram of several signals generated by the threshold level control block corresponding to a correct threshold level, a threshold level that is set too high, and a threshold level that is set too low.

FIG. 3 shows a timing diagram of several signals generated by the threshold level control block corresponding to a correct threshold level, a threshold level that is set too high, and a threshold level that is set too low. A portion of the VFO field consisting of seven domains 301–307 is shown. Note that the width of each of the domains 301–307 is equal to the width of each of the spacings between these domains. As described above, a transducer is used to convert the magnetic information conveyed by the domains 301–307 into an electrical signal. The electrical signal is then processed and the output analog signals into the comparator of the threshold adjustment circuit are shown as 308–310 and 317–319. In particular, signals 308–310 correspond to the positive halves of a differential signal, whereas 317–319 correspond to the negative halves of a differential signal. More specifically, signals 308 and 317 correspond to the situation wherein the threshold is set correctly. Signals 309 and 318 correspond to the situation wherein the threshold is improperly set too high. And signals 310 and 319 correspond to the situation wherein the threshold is improperly set too low.

It can be seen that if the threshold is set correctly, the positive and negative comparator output signals have a 50% duty cycle. In other words, the width of the "1's" is equal to the width of the "0's". Comparator output signals 311–312 correspond to a threshold that is correctly set. However, if the threshold is set too high, the positive and negative comparator outputs have a duty cycle less that 50%. In other words, the width of the "1's" is less than the widths of the "0's". Comparator output signals 313–314 correspond to a threshold that is set too high. Conversely, if the threshold is set too low, the positive and negative comparator outputs have a duty cycle greater that 50%. Hence, the width of the "1's" is greater than the width of the "0's". Comparator output signals 315–316 correspond to a threshold that is set too low.

Figure 4:
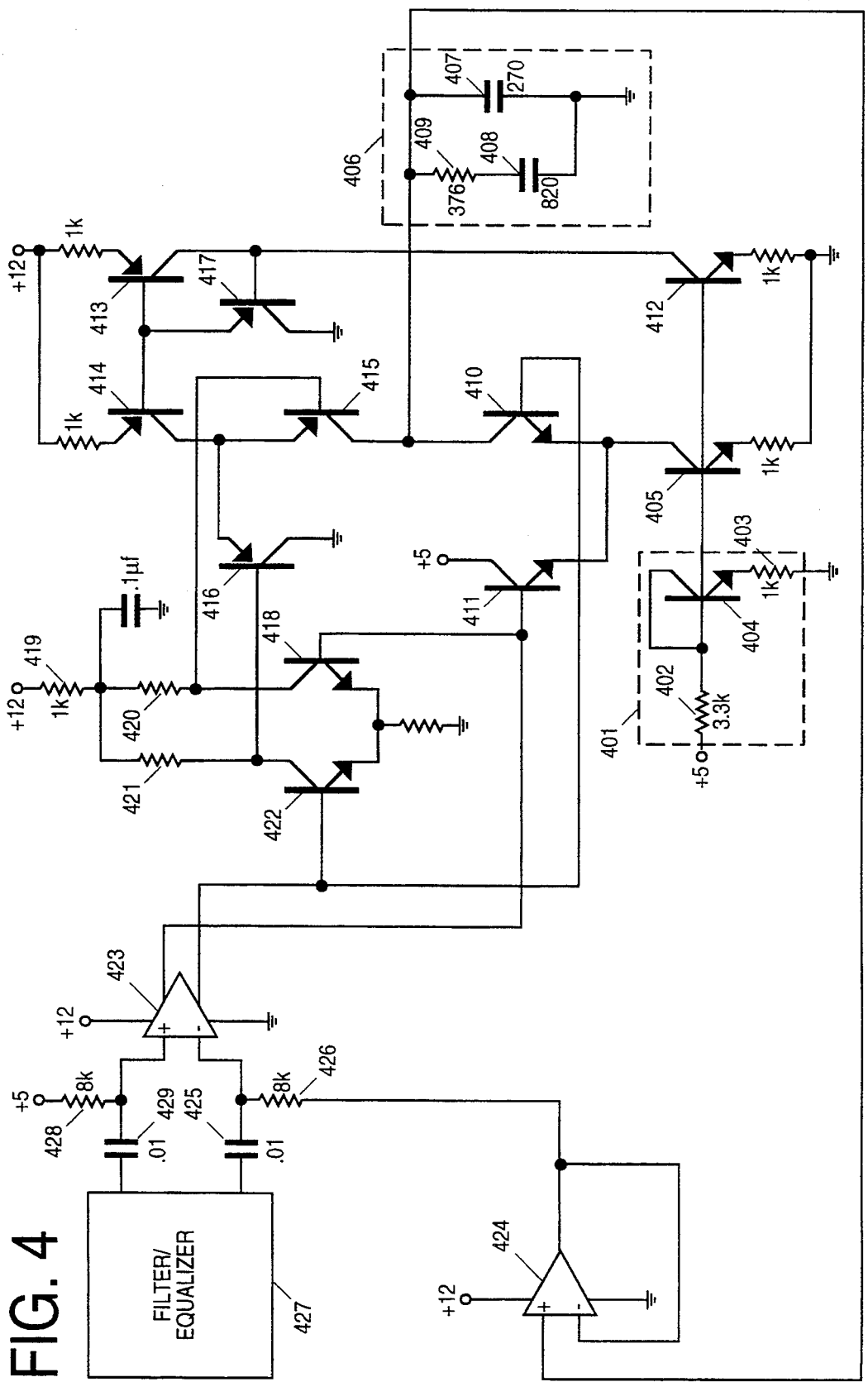
FIG. 4 shows a detailed circuit diagram of the currently preferred embodiment of the threshold level controller.

FIG. 4 shows a detailed circuit diagram of the currently preferred embodiment of the threshold level controller. A current source 401 is used to provide a constant current reference. Current source 401 is comprised of resistors 402–403 and transistor 404. This reference current is mirrored by transistor 405 to produce a discharge current for the compensation network 406. Compensation network 406 is comprised of capacitor 407 in parallel with the series combination of capacitor 408 and resistor 409. The discharge current for compensation network 406 is controlled by the transistor switches 410 and 411. Similarly, the reference current of current source 401 is mirrored by transistors 412–414 to produce a charging current for the compensation network 406. The charging current is controlled by transistor switches 415 and 416. Transistors 422 and 418 along with resistors 419–421 form a level shifting circuit to drive transistor switches 415 and 416. The positive output of comparator 423 is coupled to the base of transistors 418 and 411, and the negative output of comparator 423 is coupled to the base of transistors 422 and 410. Hence, when the positive output of comparator 423 goes active, transistor switch 415 is turned on and transistor 410 is turned off. Thereby, charging current flows into the compensation network 406. Conversely, when the positive output of comparator 423 goes low, transistor 410 is turned on, and transistor 415 is turned off. Under those circumstances, current is discharged from compensation network 406.

As described above, during the VFO field, the signal at the output of comparator 423 due to the marks should be of the same duration as that due to the spaces. If the threshold level is correctly set, then the same mount of charge will flow into compensation network 406 as will flow out of compensation network 406 during each cycle of the signal. Thus, the error voltage at the output of the compensation network 406 remains the same. If the threshold happens to be set too high, then the output from the positive side of comparator 423 due to the marks, will be on for a shorter duration than that from the negative side of comparator 423 due to the spaces. As a result, more net charge is caused to flow out of compensation network 406 than will flow in compensation network 406 during each cycle. Consequently, the error voltage will decrease. However, if the threshold level happens to be set too low, then the output from the positive side of comparator 423 will be on for a longer duration than that from the negative side of comparator 423. Consequently, more net charge is caused to flow into the compensation network 406 than will flow out of compensation network 406 during each cycle. Thereby, the error voltage will increase.

The signal on the compensation network 406 is buffered by operational amplifier 424. Output from operational amplifier 424 controls the pull-up voltage on the AC coupling network comprised of capacitor 425 and resistor 426. Capacitor 425 and resistor 426 provides AC coupling for the negative half of the differential signal from filter/equalizer 427. Likewise, capacitor 429 and resistor 428 AC couples the positive half of the differential signal provided by filter/equalizer block 427. Hence, when the average level of the negative half of the differential signal is greater than that on the positive half of the differential signal (e.g., 6 volts), then the negative half is shifted upwards relative to the positive half. Since the output of comparator 423 switches at the point at which the positive and negative inputs are equal, this translates into an increase in the threshold level. Conversely, when the error voltage decreases, the negative half of the differential signal is shifted lower relative to the positive half. The consequence of this is that the threshold level is decreased. Therefore, if the threshold level, as indicated by the pull-up voltage on AC coupling network of capacitor 425 and resistor 426 is too high, the feedback loop will cause the error voltage to decrease. This decrease adjusts the threshold back to the correct level. Likewise, if the threshold voltage is too low, the feedback loop will cause the error voltage to increase, thereby setting the threshold back to the correct level.

It should be noted that in the currently preferred embodiment, the analog signal remains differential throughout the detection process. This improves the signal-to-noise ratio, thereby providing for improved margin. Furthermore, using the charge pump technology disclosed results in high accuracy, low offsets, and tighter control over the threshold level. This also increases the margin.

Figure 5:
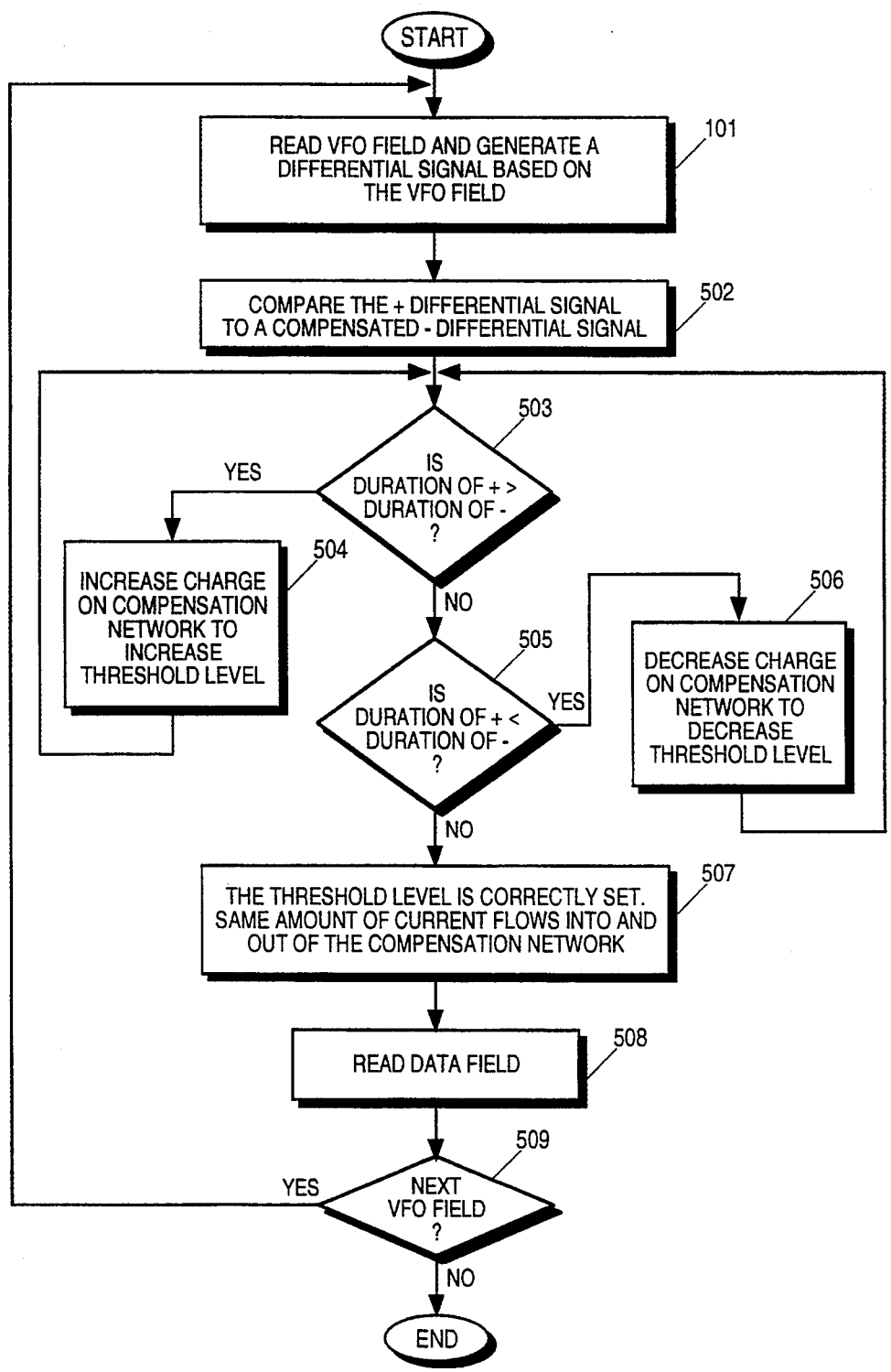
FIG. 5 shows a flowchart describing the steps for adjusting the threshold level.
Figure 5:
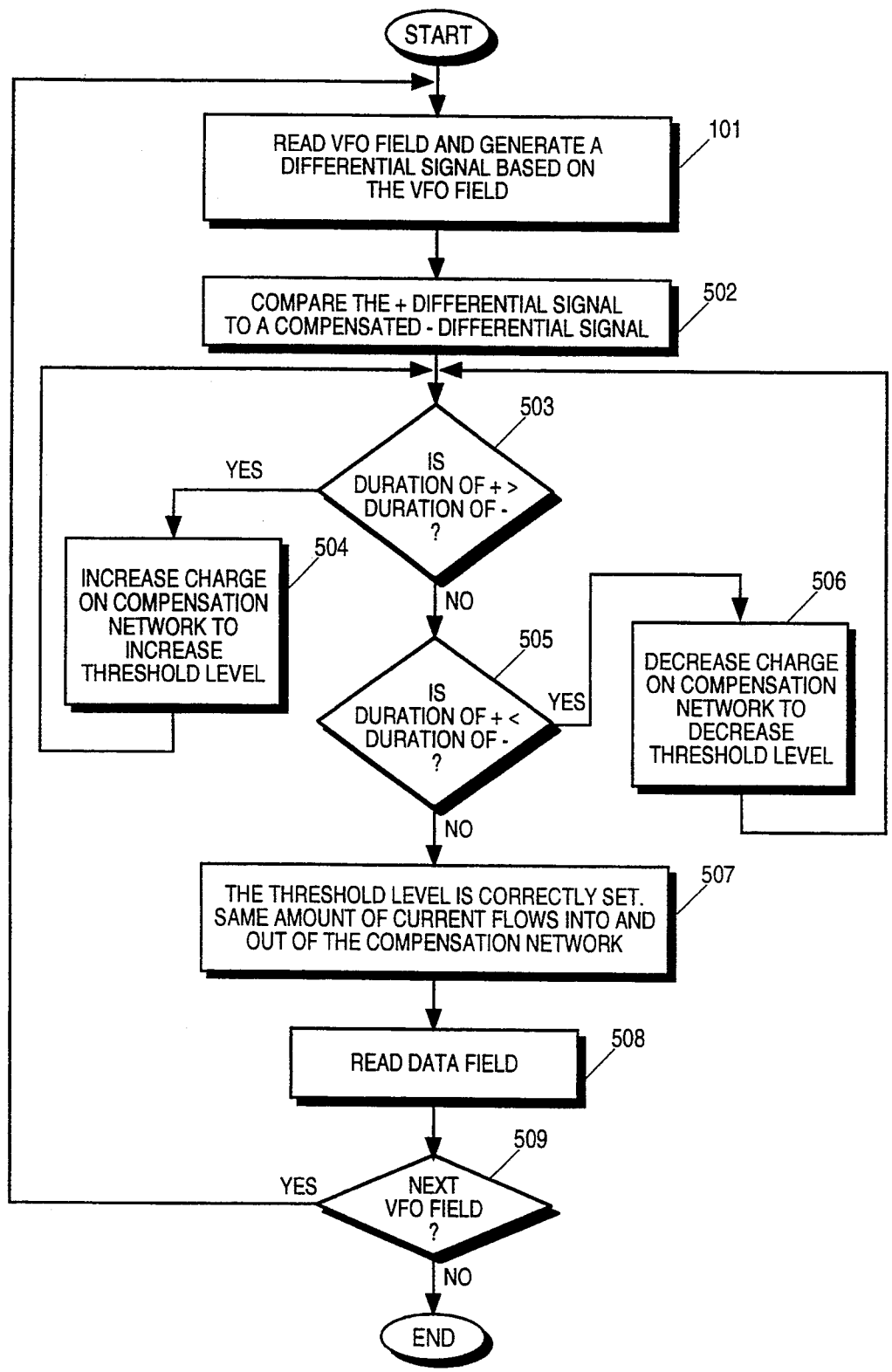

FIG. 5 shows a flowchart describing the steps for adjusting the threshold level. Initially, the VFO field is read from the optical disk. A differential signal is then generated based on the VFO field that was read, step 501. In step 502, the positive differential signal is compared against the compensated negative differential signal. A determination is made as to whether the time during which the positive half of the differential signal is greater than the negative half ("plus time") is greater than the time during which the negative half of the differential signal is greater than the positive ("minus time"), step 503. If the "plus time" is greater than the "minus time," the net charge on the compensation network is increased, step 504. This increase in charge causes the threshold level to also be increased. The process then proceeds back to step 503. However, if it is determined in step 505 that the "plus time" is less than the "minus time," step 506 is performed. In step 506, the charge on the compensation network is decreased. This causes the threshold level to likewise decrease. Thereupon, the process proceeds back to step 503.

If it is determined that the "plus time" is equal to the "minus time," then this indicates that the threshold level is correctly set. In this case, the mount of current flowing into the compensation network is equal to the amount of current flowing out of the compensation network and the threshold level remains the same, step 507. The data field is then read according to the adjusted threshold level, step 508. In step 509, for the next VFO field encountered, steps 501-508 are repeated.

Thus, an apparatus and method for determining and setting a threshold level in an optical recording system having a pulse width modulation scheme is disclosed.

What is claimed is:

1. A method for setting a threshold voltage for determining bit positions of digital data stored on an optical recording device utilizing pulse width modulation, said method comprising the steps of:
    reading a pattern from an optical medium, said pattern having a particular duty cycle;
    processing said pattern according to said threshold voltage to generate a processed pattern;
    determining whether said processed pattern has said particular duty cycle;
    comparing a positive differential signal to a negative differential signal, wherein said positive differential signal and said negative differential signal correspond to said pattern;
    controlling an amount of current flowing to/from a compensation circuit in accordance with said comparing step;
    feeding back a signal output from said compensation circuit to one of said positive differential signal and said negative differential signal;
    adjusting said threshold voltage according to said signal output from said compensation circuit;
    reading a data field once said processed pattern is substantially the same as said particular duty cycle.

2. The method of claim 1 further comprising the step of buffering said signal output from said compensation circuit before feeding back said signal.

3. The method of claim 1 further comprising the step of providing a charge pump for said controlling step.

4. The method of claim 1, wherein said particular duty cycle is 50%.

5. An apparatus for setting a threshold voltage for determining bit positions of digital data stored on an optical recording device utilizing pulse width modulation, comprising:
    optics for reading a pattern from an optical medium, said pattern having a first duty cycle;
    a feedback circuit for processing said pattern according to said threshold voltage to generate a feedback signal;
    a comparator coupled to said feedback circuit for comparing said feedback signal and said pattern to generate a compared signal having a second duty cycle, said comparator comparing a positive differential signal to a negative differential signal, said positive differential signal and said negative differential signal corresponding to said pattern;
    a compensation circuit coupled to said comparator for adjusting said threshold voltage until said first duty cycle approximately equals said second duty cycle.

6. The apparatus of claim 5 further comprising a charge pump for controlling an amount of current input to and output from said compensation circuit.

7. In an optical recording device utilizing pulse width modulation, an apparatus for adjusting a threshold voltage used to determine bit timing, comprising:

means for reading a pattern from an optical medium, said pattern having a particular duty cycle;

means for processing said pattern according to said threshold voltage to generate a processed pattern;

means for determining whether said processed pattern has said particular duty cycle;

means for adjusting said threshold voltage until said processed pattern substantially attains said particular duty cycle, said means including a compensation circuit coupled to said determining means providing an output signal that corresponds to a duty cycle difference between said processed pattern and said particular duty cycle, a comparator for comparing a positive differential signal to a negative differential signal, wherein said positive differential signal and said negative differential signal correspond to said pattern, and a feedback circuit for adjusting said positive and negative differential signals in accordance with said output signal;

means for reading a data field once said processed pattern attains said particular duty cycle.

8. The apparatus of claim 7 further comprising means for buffering said output signal.

9. In an optical data storage system, an apparatus for adjusting a threshold voltage that determines bit positions of a pulse width modulated pattern stored on a disk medium, the apparatus comprising:

a read circuit which converts the pattern into a first differential signal having an associated first duty cycle;

a comparator coupled to receive the first differential signal and output a second differential signal having positive and negative signals and an associated second duty cycle that depends upon a threshold level of the comparator;

a feedback compensation network coupled to receive the second differential signal, the feedback compensation network including a charge pump which generates an error voltage based upon a comparison of the positive and negative signals, the error voltage being coupled to the comparator to adjust the threshold level until the first duty cycle approximately equals the second duty cycle.

10. The optical data storage system of claim 9 further comprising a means for generating a data pulse for each edge of either the positive or negative signals of the second differential signal.

11. A method for setting a threshold voltage for determining bit positions of digital data stored on an optical disk utilizing pulse width modulation, said method comprising the steps of:

(a) converting a field pattern recorded on the optical disk into an electrical signal having a first duty cycle;

(b) generating a differential signal having positive and negative signal components by comparing the electrical signal against the threshold level, the differential signal having a second duty cycle;

(c) generating an error voltage based upon a comparison the positive and negative signal components;

(d) adjusting the threshold level according to the error voltage until the second duty cycle of the differential signal is approximately equal to the first duty cycle of the electrical signal;

(e) outputting data pulses for each edge of the differential signal once the second duty cycle is approximately equal to the first duty cycle.

12. The method according to claim 11 further comprising the step of:

(f) repeating steps (a)-(e) whenever the field pattern changes.

* * * * *